United States Patent
Silverman

[15] 3,694,011
[45] Sept. 26, 1972

[54] COUPLING
[72] Inventor: Arthur A. Silverman, 2245 Harmain Road, Pittsburgh, Pa. 15235
[22] Filed: Nov. 23, 1970
[21] Appl. No.: 91,834

[52] U.S. Cl...........................287/104, 15/104.3 SN
[51] Int. Cl................................................F16d 1/00
[58] Field of Search................287/103, 104, 103 A; 15/105.3 SN; 24/230 AU, 211 M, 201 D

[56] References Cited
UNITED STATES PATENTS

| | | |
|---|---|---|
| 1,134,179 | 4/1915 | Boyd.....................287/103 A |
| 2,449,167 | 9/1948 | Hopewell....................24/223 |
| 1,741,969 | 12/1929 | Bellows..................287/104 X |
| 2,521,172 | 9/1950 | Kollmann...............287/103 R |
| 3,397,420 | 8/1968 | Schneider..........287/103 R X |

Primary Examiner—Andrew V. Kundrat
Attorney—Carothers and Carothers

[57] ABSTRACT

A coupling particularly adaptable for readily connecting and disconnecting sections of sewer snake having a male member and a female member wherein the former is slidable within a transverse slot provided in the latter. Rotatable locking means is mounted on the female member which is capable in one position to permit the reception of the connecting end of the male member in the female transverse slot end in a second position to retain the male member in locked engagement within the female member transverse slot. Means is provided to releasably retain the rotatable locking means in the second mentioned position.

8 Claims, 5 Drawing Figures

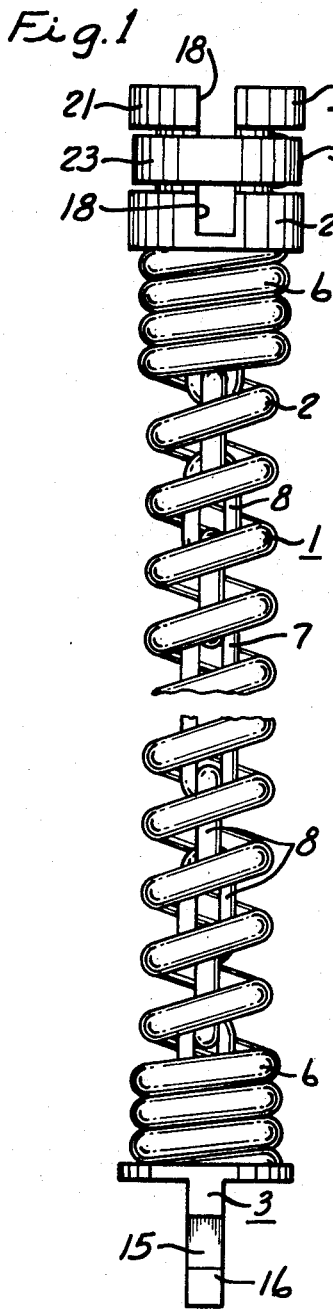
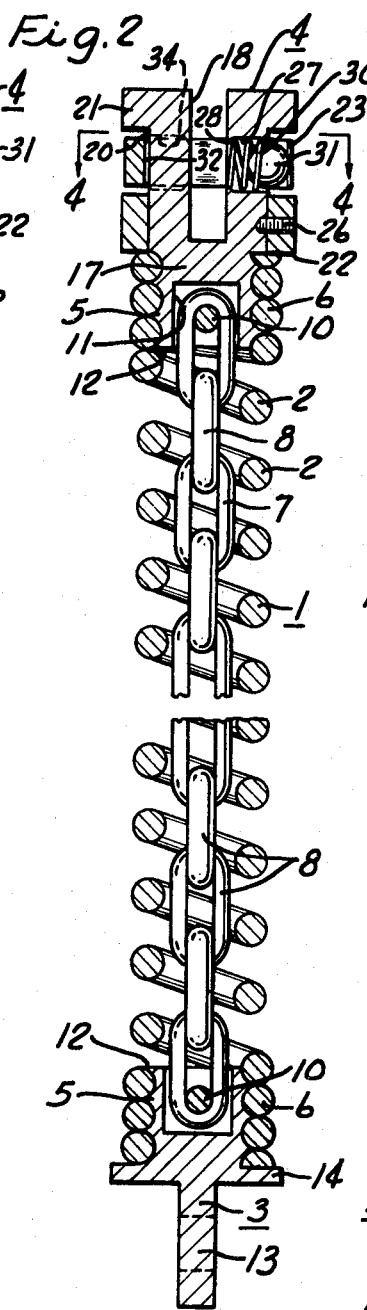
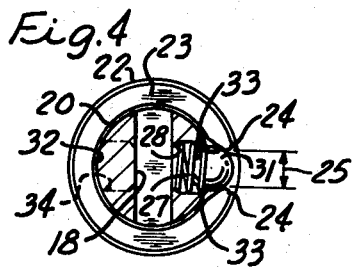
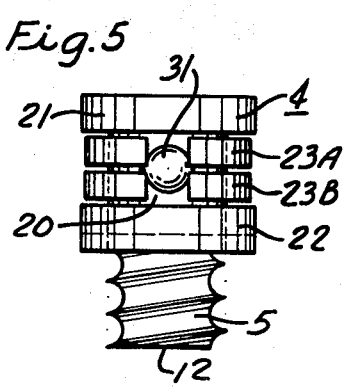
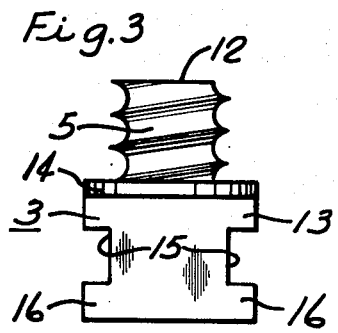
PATENTED SEP 26 1972
3,694,011
INVENTOR.
ARTHUR A. SILVERMAN
BY
CAROTHERS & CAROTHERS
HIS ATTORNEYS

COUPLING

BACKGROUND OF THE INVENTION

This invention relates to couplings of the interlocking type (287-103) and more particularly to couplings used for joining together lengths of a sewer snake implement (15-104.5).

If one were to review the progression of the art concerning sewer snakes, he would find that the history of this area of art is centered on seeking an improved coupling for use in connecting together various lengths of sewer snakes. These couplings generally consist of two sections which may be readily coupled together so that two lengths of sewer snakes may be maintained secured, in connected relationship while employed in a sewer pipe or conduit that is to be cleaned of debris. It is all important that these couplings are capable of transmitting torque since the sewer snake is usually rotated as it is advanced into the conduit. Also, they have to be constructed so as not to become readily disconnected while being employed in a conduit necessitating the retrieval of the sewer snake section still in the conduit by digging into the earth to the area of the conduit to remove the disconnected section of sewer snake. Thus, the coupling of the type for employment with sewer snakes must be capable of transmitting torque and also capable of being subject to large stresses, yet, at the same time, be readily disjoined upon completion of use without the use of accessory tools. Some of these types of couplings are composed of a matrix of complicated movable parts which may readily jam or become difficult to manipulate due to the rough treatment that is imposed on such couplings when placed in use on the ends of sections of sewer snakes.

As a side matter, it should be noted at this point, that the need for higher strength and more durable couplings for connecting sections of sewer snakes has been in greater demand because of the recently revived practice on a large scale of using a chain comprising a plurality of chain links with the ends of the chain connected respectively to the male coupling member and a female coupling members. The chain is located within the convolutions of the helically wound rod or cable comprising the sewer snake. Such chains provide a positive, although flexible, means of transmitting torque and, also, are used to prevent the possibility of the sewer snake section from breaking while employed in a conduit to be cleaned. Such chains also carry the actual torque applied to such sewer snakes, rather than the helically wound rod, upon their rotational movement as applied by a sewer cleaning machine or device.

As previously mentioned, the use of such chains is not new as shown by Priest, U.S. Pat. No. 501,731; Wrigley, U.S. Pat. No. 619,920; Morrison et al. U.S. Pat. No. 1,093,066; Robinson et al. U.S. Pat. No. 2,474,690 (287-85) and Schneider, U.S. Pat. No. 3,397,420 (15-104.3). A cable instead of a chain has also been used for such purposes as shown in Stremel, U.S. Pat. No. 1,600,373; Wait et al. U.S. Pat. No. 2,509,115 (175-376) and Kollmann, U.S. Pat. No. 3,118,159 (15-104.3).

The prior art in the coupling field is very extensive. Many couplings have been devised for joining together two cylindrically shaped pieces by employing co-operative male and female members. The male member is provided with a dovetail extension while the female member is provided with a dovetail slot. This type of coupling has been popular because of its excellent capability for transmitting torque. Locking means are provided in these couplings which are movable axially relative to the coupling sections to releasably maintain the male and female members in connected relation. Examples of such couplings are found in Swartsfarger, U.S. Pat. No. 1,233,933; Morue, U.S. Pat. No. 1,787,831; Schalk, U.S. Pat. No. 1,805,014; and Schalk, U.S. Pat. No. 1,834,425.

In the sewer snake art, couplings were devised so that they could not readily be disconnected but either required the use of tools, such as found in Kollmann, U.S. Pat. No. 2,278,324 (287-75), or were not intended to be disconnected at all, such as found in Kjerulff, U.S. Pat. No. 2,557,119 (287-103). However, the dovetail type of coupling was adopted in the sewer snake art as shown in U.S. Pats. to Kollmann, Nos. 2,755,115 (287-76); 2,892,649 (287-103); 3,118,159 (15-104.3); and 3,402,953 (287-103). These couplings also have means that are moved axially within the coupling in order to insure that the coupling would not disengage during use. At the same time, they required some type of tool for disengagement of the male member from the female member when the lengths of sewer snake being used are disconnected from one another.

Others have devised sewer snake couplings employing the well-known bayonet type of joint rather than the dovetail type of joint. One such example is Duetsch et al., U.S. Pat. No. 2,880,435 (15-104.3). However, due to the nature of this type of joint, they require a tool in the form of a wrench for their disconnection.

The next step of progression in the art was the provision of a coupling that could be readily disconnected without the need for any tool whatsoever. The requirement of such a tool has been a problem to the sewer snake user because such tools are usually of a special design and easily misplaced and lost.

In Kollmann, U.S. Pat. No. 2,521,172 (287-103) [also Kollmann U.S. Pat. No. 2,836,838 (15-104.09)] a coupling was introduced that did not necessitate the employment of a tool. Rather, after the dovetail male and female sections were engaged, a axially aligned biased locking member having finger engaging portions on the peripheral exterior of the coupling was allowed to move in an axial direction to cover the dovetail joint and prevent accidental disengagement of the male and female coupling members. However, a major drawback in employing these sewer snake couplings has been the large amount wear and damage imposed upon the locking member, particularly the finger engaging portions, causing the locking member to become incapable of being readily connected and disconnected. Thus, the coupling under normal sewer or conduit cleaning use would not outlast the useful life of the sewer snake.

Thus, what was needed was a coupling for sewer snake application that could readily and quickly be connected and disconnected by the user wherein the manipulative parts for disconnection of the coupling joint were recessed or positioned within the coupling in such a manner as not to be subjected to wear or damage due to exposure of such parts exteriorly of the coupling. Such a coupling structure is shown in Schneider, U.S. Pat. No. 3,397,420 (15-104.3) wherein a biased transverse movable latch bar in the female member of the coupling is provided to be positioned in a corresponding slot in the male member of the coupling to prevent coupling disconnection. The latch bar can manually be drawn rearwardly to permit disconnection, there being recessed areas provided in the sides of the female coupling member for easier gripping of the ends of the latch bar. Experience has shown that although this coupling eliminated a drawback found in the Kollmann, U.S. Pat. No. 2,521,172, coupling, it is an expensive construction and, upon continued use, the latch bar becomes difficult to manipulate particularly since there is not much surface on the ends of the bar for one to firmly grasp for subsequent rearward retraction of the bar to disconnect the coupling sections.

Thus, the search continues for a coupling adapted for sewer snake application which is of simple construction, easily manufactured; and low cost in manufacture but by the same token, is capable of withstanding large torque stress in sewer or conduit cleaning use and yet, time and time again, is easily manipulated to quickly connect and disconnect sections of sewer snake with no possible excessive wear or damage to the means used to maintain the coupling joint in secured engagement while the sections of sewer snake are in use.

The coupling disclosed herein meets these objectives in the manner hereinafter set forth.

SUMMARY OF THE INVENTION

The principal object of this invention is the provision of a coupling particularly adaptable for connecting together sections of sewer snake, the coupling joints of which can be easily and quickly connected and disconnected without the aid of a tool and yet is simple in design and of low-cost construction and manufacture.

Another object of this invention is the provision of a coupling having a male coupling member and a female coupling member provided with rotatable locking means on the female member capable in one position to permit the reception of the male member into the female member and in a second position to retain the male member in locked engagement with the female member.

Another object of this invention is the provision of means to releasably retain the locking means, just mentioned, in the second position so that accidental rotational movement of the locking means does not occur during use of the sewer snake in a conduit to be cleaned, causing possible coupling disconnection.

Another object of this invention is the provision of coupling having a ring member forming the locking means and positioned in a groove provided in the body of the female member. The ring member is provided with open ends forming a slot to receive the connecting extension of the male member in the female member when the ring member is in the first position, above mentioned. An outwardly biased ball member forms the releasably retaining means, above mentioned, which is received between ring member ends at the second position, above mentioned, but retained thereby to prevent rotational movement of the ring member. Manual depression of the ball member will again permit rotation of the ring member.

Other objects and advantages appear hereinafter in the following description and claims.

The accompanying drawings show, for the purpose of exemplification without limiting the invention or the claims thereto, certain practical embodiments illustrating the principles of this invention wherein:

FIG. 1 is a longitudinal view of single section of a sewer snake with parts broken away having a male coupling member on one end and a female coupling member on the other end which coupling members comprise this invention.

FIG. 2 is a longitudinal cross-sectional view of the sewer snake of FIG. 1.

FIG. 3 is a side or plane view of the male coupling member.

FIG. 4 is a cross-sectional view of the female coupling member taken along the line 4—4 of FIG. 2.

FIG. 5 is a side view of a modified form of the female coupling member.

Reference is made to the figures wherein there is shown the coupling comprising this invention being employed with a sewer snake 1. The sewer snake 1 consists of a helically wound rod or wire 2, the ends of which are secured to the coupling members as clearly shown in FIGS. 1 and 2. The coupling consists of two sections, a male member 3 and a cylindrically shaped female member 4. Each of the members 3 and 4 are provided with a cylindrically shaped threaded portion 5 to receive the helically wound end sections 6 of the sewer wire 2. As can be seen clearly in FIG. 2, the end sections 6 are threadably secured on the threaded portions 5.

For added strength to the sewer snake 1, the chain 7 is provided and, as shown in FIG. 2, consists of a plurality of chain links with the end links of chain 7 being supported on the pivot pins 10 disposed transversely in the cylindrical opening 11 in each of the ends 12 of the threaded portions 5 of the male and female members 3 and 4.

As shown in FIGS. 1, 2 and 3, the male member 3 also includes a connecting extension 13 which is substantially a flat section extending from the male member base 14. The connecting extension 13 also is provided with the recesses 15 forming the locking shoulders 16, the purpose of which will be explained later.

Reference is now made to the female member 4 which has a generally cylindrically shaped body as depicted at 17 and is provided with the transverse slot 18 adapted to receive the connecting extension 13 of the male member 3. The female member 4 is provided with the groove, designated as 20, which is formed between the annular shoulder portion 21 of the body 17 and the locking ring 22.

Rotatable locking means is provided on the female member 4 for releasably retaining the connecting extension 13 of the male member 3 in the transverse slot 18 of the female member 4. This rotatable locking means may comprise an open end ring member 23 as shown in FIGS. 2 and 4. The ring member 23 is provided with open ends 24 forming a slot through the ring member as depicted by the arrow 25 in FIG. 4. As can be seen on viewing FIG. 2, the ring member 23 is maintained in position on the female member 4 by first slipping the ring member 23 over the body 17 from the threaded portion end 12 of the female member 4. After the ring member 23 has been positioned as shown in FIG. 2, the locking ring 22 is then positioned from end 12 over the body 17 of the female member 4 and then secured in position on body 17 by means of the threaded screw member 26. As positioned, the ring member 23 is easily provided to rotate about the body 17 within the formed groove 20. The helical end section 6 of the snake 1 may then be threadably engaged onto the threaded portion 5.

A radial opening 27 is provided in the body 17 and is drilled into the body 17 so that the head of the drill forming the opening 27 is not passed through the body 17 into the area of the transverse slot 18 in order to form the conical shaped lip 28 in the bottom of opening 27. This formed conical lip 28 retains the spring member 30 within the opening 27 and prevents it from passing through the bottom of the opening into the area of the transverse slot 18.

As shown in FIG. 2, the spring member 30 as seated on the conical lip 28, supports the ball member 31 and imposes an an outwardly directed force on the ball member 31 against either the under surface 32 of the ring member 23 or against the ring member ends 24 in the area of the slot designated by the arrow 25, depending on the position of the ring member.

For purposes of convenience in operation of the rotational movement of the ring member 23, the ring ends 24 are provided with transversely disposed surfaces 33 which may be characterized as bevelled surfaces which receive and embrace the ball member 31 when the ring member slot 25 is positioned over the ball member 31 as shown in FIG. 4. Also, the bevelled surfaces 33 permit convenient rotation of the ring member 23 from the position shown in FIG. 4 upon slight depression of the ball member 31 inwardly into the cylindrical opening 27 so that either one of the bevelled surfaces 23 readily guides the ball member 31 further into the opening 27 as the ring member 23 is rotated. In this connection, it should be noted that the ball member 31 is of such a size and dimension as to be readily received within the cylindrical opening 27.

It should be pointed out that the means to releasably retain the rotatable locking means in the form of an open end ring member 23 may be more than one in number. Thus, for example, a cylindrical opening may be provided as shown in the dotted line area at 34 in FIGS. 2 and 4 in order to receive a spring member 30 together with ball member 31 in addition to those already shown. Such a cylindrical opening 34 would be diametrically opposite to the cylindrical opening 27 already shown in FIG. 2. In this manner, the ring member 23 could be conviently rotated in either direction after insertion of the connecting extension 13 into the transverse slot 18 in order for a ball member to be proportioned relative to ring slot 25 to releasably retain the ring member from further possible rotation. Also, it should be mentioned that this releasably retaining means in the form of the ball member 31 need not be disposed at right angles relative to the longitudinal length of the transverse slot 18 but may be positioned in a radial opening provided at any point along the surface of the body 17 of the female member 4 in the bottom of the groove 20, such as, for example, immediately adjacent to the transfer slot 18.

Mention is made at this point to the manner of connecting and then subsequently disconnecting the male member 3 to and from the female member 4. It should be noted that the connecting extension 13 is positioned within the transverse slot 18 of the female member 4 and, as positioned, the connecting end recesses 15 are in alignment or contiguous relationship with the cross-sectional configuration of groove 20.

In order that the connecting extension 13 may be readily inserted into the slot 18, the open end ring member 23 must be positioned with its slot 25 in contiguous relationship with the transverse slot 18. When the ring member 23 is in this position, only then can the connecting extension 13 be inserted into the transverse slot 18. This position is designated as the "first position."

After the connecting extension 13 has been properly inserted into transverse slot 18, the ring member 23 is rotated to the position shown in FIG. 4 which is designated as the "second position." In this position or second position, the ball member is urged by the force of the spring member 30 to position itself between the bevelled surfaces 33 of ring member ends 24. Thus, the ring member 23 is not permitted to readily rotate within the groove 20 because the ball member 31 obstructs the possible movement of the ring member. Therefore, accidental rotation of the ring member 23 will not occur, causing disconnection of the male member 3 from the female member 4 in those cases where the ring member 23 would accidentally be positioned its slot 25 in contiguous relation with the transverse slot 18 of the female member 4.

In order to disconnect the coupling members 3 and 4, one need manually with his thumb or finger to depress the ball member 31 inwardly into the cylindrical opening 27 to permit the passage of the bevelled surface 33 over the surface of the ball member 31 upon rotation of the ring member 23. The undersurface 32 of the ring member 23 will thereafter maintain the ball member 31 recessed within the cylindrical opening 27. The ring member 23 then may be readily rotated to the first position, mentioned above, in order to permit removal of the connecting extension 13 from the transverse slot 18 of the female member 4. It should be understood that the locking shoulders 16 of the male member connecting extension 13 are actually what retain the male member 3 in connected relation with the female member 4 due to engagement by the ring member 23 against these shoulders when the latter is in the second position. Thus, it is the shoulders 16 that are important rather than recesses 15 which may be of any length along the edges of connecting extension 13 as long as they are able to receive the width of the ring member 23. For example, the recesses 15 could be extended up to the male member base 14.

In FIG. 5 there is shown a modified form of the ring member 23 which consists of two sections, ring member 23A and ring member 23B. The ring member is provided in two sections 23A and 23B in order to make it necessary for rotation of both ring members 23A and 23B upon depression of the ball member 31 to remove the connecting extension 13 from the transverse slot 18 of the female member 4. Not only does the use of two such ring members insure further the prevention of accidental disconnection of the male member 3 from the female member 4 while the same are employed in a conduit for cleaning but also provides a "back-up" ring member if one of such ring members 23A or 23B should become broken due to long use or mistreatment.

Having described in detail the coupling comprising this invention which meets and satisfies the objectives set forth in the summary of invention, I claim:

1. A coupling comprising a male member and a female member wherein the former is slidable within a transverse slot in the later, a continuous groove in said female member, recesses forming shoulders in the sides of said male member, said recesses being contiguous with said groove when said male member is inserted in said female member transverse slot, a rotatable open ring member received in said groove and rotatable to one position to permit the reception of said male member by said female member and to a second position to retain said male member in locked engagement within said female transverse slot, means to releasably retain said rotatable locking means in said second position, said open ring member having ring ends to form a slot therebetween, said first position being provided when said ring member slot is rotatably positioned over said transverse slot and said second position being provided when said ring member slot is rotatably positioned over said releasable retaining means.

2. The coupling of claim 1 characterized in that said releasable retaining means comprises a ball member receivable within an opening provided in the bottom of said groove, a spring for urging said ball member out of said opening, said ball member positioned between but retained by said ring member ends when said ring member is rotated to said second position.

3. The coupling of claim 2 characterized by two open ring members forming said rotatable locking means and each having ring ends to form a slot therebetween, said first position when said ring member slots are rotatably positioned over said transverse slot and said second position when one of said ring member slots is rotatably positioned over said releasable retaining means.

4. A coupling comprising a male member having oppositely disposed recesses in the sides thereof forming adjacent shoulders, a female member generally of cylindrical configuration and having a transverse slot therethrough for reception of said male member, a groove on the cylindrical surface of said female member which is contiguous with said male member recesses when said male member is inserted within said female member transverse slot, a rotatable open ring member in said groove having ring ends forming a slot therebetween and capable upon rotation to one position to permit insertion of said male member through said ring member slot into said transverse slot and upon subsequent rotation to a second position to retain said members in secured engagement, biased projecting means in the bottom of said groove and disposed radially within said female member, said projecting means positionable within said ring member slot upon rotation of said ring member to said second position.

5. The coupling of claim 4 characterized in that said biased projecting means comprises a ball member positioned within a cylindrically shaped opening in said groove bottom, a spring to urge said ball member out of said hole into said ring member slot when said ring member slot is rotated in position over said ball member.

6. The coupling of claim 5 characterized by bevelled surfaces formed on said ring member ends to receive and embrace said ball member when said ring member slot is rotated in position over said ball member.

7. The coupling of claim 4 characterized in that said male member recesses are slots which are contiguous with said female member groove when said male member is inserted within said female member transverse slot.

8. A coupling comprising a male member and a female member wherein the former is slidable into a transverse slot in the latter, a rotatable locking ring member secured on said female member for axial rotation and having an open slot which is positionable by rotation of said ring member to be contiguous with said transverse slot to receive said male member therein and positionable by rotation of said ring member to a second position to retain said male member in locked engagement with said female member, and means biased to penetrate into said ring member slot to releasably fix said rotatable locking ring from further rotation when said ring member slot is positioned over said second position.

* * * * *